United States Patent
Yu

(10) Patent No.: US 9,324,182 B2
(45) Date of Patent: Apr. 26, 2016

(54) SINGLE PASS RADIOSITY FROM DEPTH PEELS

(75) Inventor: Corrinne Yu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 13/564,124

(22) Filed: Aug. 1, 2012

(65) Prior Publication Data

US 2014/0035915 A1 Feb. 6, 2014

(51) Int. Cl.
*G06T 15/55* (2011.01)

(52) U.S. Cl.
CPC ...................... *G06T 15/55* (2013.01)

(58) Field of Classification Search
CPC combination set(s) only.
See application file for complete search history.

(56) References Cited

U.S. PATENT DOCUMENTS

| | | | |
|---|---|---|---|
| 6,525,730 B2 | 2/2003 | Tampieri | |
| 6,952,206 B1* | 10/2005 | Craighead | 345/422 |
| 7,199,795 B2 | 4/2007 | Christensen et al. | |
| 2006/0017729 A1 | 1/2006 | Chow et al. | |
| 2008/0018647 A1* | 1/2008 | Bunnell | 345/426 |
| 2008/0225042 A1 | 9/2008 | Birtwistle et al. | |
| 2009/0184960 A1* | 7/2009 | Carr et al. | 345/422 |
| 2009/0322750 A1 | 12/2009 | Boulton | |
| 2011/0012901 A1* | 1/2011 | Kaplanyan | 345/426 |

FOREIGN PATENT DOCUMENTS

EP 0251800 A2 1/1988

OTHER PUBLICATIONS

Nießner, Matthias, Henry Schäfer, and Marc Stamminger. "Fast indirect illumination using layered depth images." The Visual Computer 26.6-8 (2010): 679-686.*
Ritschel, "Approximating Dynamic Global Illumination in Image Space", retrieved at <<http://www.mpi-inf.mpg.de/~ritschel/Papers/SSDO.pdf>> Feb. 27, 2009, pp. 75-82.
"Cascaded Light Propagation Volumes for Real-Time Indirect Illumination", Retrieved at <<http://www.vis.uni-stuttgart.de/~dachsbcn/download/Ipv.pdf>>I3D '10 Proceedings of the 2010 ACM SIGGRAPH symposium on Interactive 3D Graphics and Games, Feb. 19, 2010, pp. 99-107.
"Leading Visual Effects Studio Digital Domain(R) Used LightWave 3D for Animating Popular TV Commercials", Retrieved at <<http://www.thefreelibrary.com/Leading+Visual+Effects+Studio+Digital+Domain(R)+Used+LightWave+3D+For . . . -a054404618>>Retrieved Date: Feb. 3, 2012, pp. 4.

(Continued)

*Primary Examiner* — Daniel Hajnik
(74) *Attorney, Agent, or Firm* — Aaron Chatterjee; Kate Drakos; Micky Minhas

(57) ABSTRACT

Techniques for single pass radiosity from depth peels are described. In one or more embodiments, radiosity for frames of a graphics presentation is computed using depth peel techniques. This may occur by rendering geometry for a frame and then computing two depth peels per frame based on the geometry, which can be used to determine occlusion of secondary bounce lights as well as color and intensity of third bounce lights for radiosity. The two depth peels may be generated in a single rendering pass by reusing rejected geometry of a front depth peel as geometry for a back depth peel. The use of depth peels in this manner enables accelerated radiosity computations for photorealistic illumination of three dimensional graphics that may be performed dynamically at frame rates typical for real-time game play and other graphics presentations.

20 Claims, 5 Drawing Sheets

(56) References Cited

OTHER PUBLICATIONS

"International Search Report & Written Opinion for PCT Patent Application No. PCT/US2013/052808", Mailed Date: Feb. 13, 2014, Filed Date: Jul. 31, 2013, 15 Pages.

Ritschel, et al., "Interactive Global Illumination Based on Coherent Surface Shadow Maps", In Proceedings of Graphics Interface, May 28, 2008, pp. 185-192.

Hachisuka, Toshiya, "Chapter 38: High-Quality Global Illumination Rendering Using Rasterization", In Book—GPU Gems 2, Apr. 2005, 21 Pages.

Gortler, et al., "Radiosity and Relaxation Methods", In IEEE Computer Graphics and Applications, vol. 14, Issue 6, Nov. 1, 1994, pp. 48-58.

Akenine-Moller, et al., "Chapter 9: Global Illumination", In Book—Real-Time Rendering, Third Edition, Jul. 25, 2008, pp. 408-412.

* cited by examiner

SINGLE PASS RADIOSITY FROM DEPTH PEELS

BACKGROUND

When rendering graphics/frames for a real-time application, such as a video game, it may be difficult and costly to incorporate realistic lighting simulations for the graphics/frames because computations for realistic rendering of shadows and lights are resource intensive and time consuming. For example, traditional techniques for radiosity computations that account for the effects of reflected light and produce photorealistic illumination may take days or even weeks to compute for complex geometry of a frame. Due to these time constraints, traditional radiosity computations may take too long to be employed for real-time illumination changes at runtime (e.g., during game play). Accordingly, traditional techniques for radiosity computations may be limited to pre-computation off-line in a development environment. Moreover, pre-computation of the lighting may be unable to satisfactorily account for illumination changes in lighting due to dynamic movement of objects in a scene, such as user controlled game characters and other moving/dynamic objects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter Techniques for single pass radiosity from depth peels are described. In one or more embodiments, radiosity for frames of a graphics presentation is computed using depth peel techniques. This may occur by rendering geometry for a frame and then computing two depth peels per frame based on the geometry, which can be used to determine occlusion of secondary bounce lights as well as color and intensity of third bounce lights for radiosity. The two depth peels may be generated in a single rendering pass by reusing rejected geometry of a front depth peel as geometry for a back depth peel. The use of depth peels in this manner enables accelerated radiosity computations for photorealistic illumination of three dimensional graphics that may be performed dynamically at frame rates typical for real-time game play and other graphics presentations.

DETAILED DESCRIPTION

Overview

Techniques for single pass radiosity from depth peels are described. In one or more embodiments, radiosity for frames of a graphics presentation is computed using depth peel techniques. This may occur by rendering geometry for a frame and then computing two depth peels per frame based on the geometry, which can be used to determine occlusion of secondary bounce lights as well as color and intensity of third bounce lights for radiosity. The two depth peels may be generated in a single rendering pass by reusing rejected geometry of a front depth peel as geometry for a back depth peel. The use of depth peels in this manner enables accelerated radiosity computations for photorealistic illumination of three dimensional graphics that may be performed dynamically at frame rates typical for real-time game play and other graphics presentations.

In the discussion that follows, a section titled "Operating Environment" is provided and describes one environment in which one or more embodiments can be employed. Following this, a section titled "Techniques for Single Pass Radiosity from Depth Peels" describes example implementation details in accordance with one or more embodiments. Last, a section titled "Example System" describes example computing systems and devices that can be utilized to implement one or more embodiments.

Operating Environment

Figure 1:
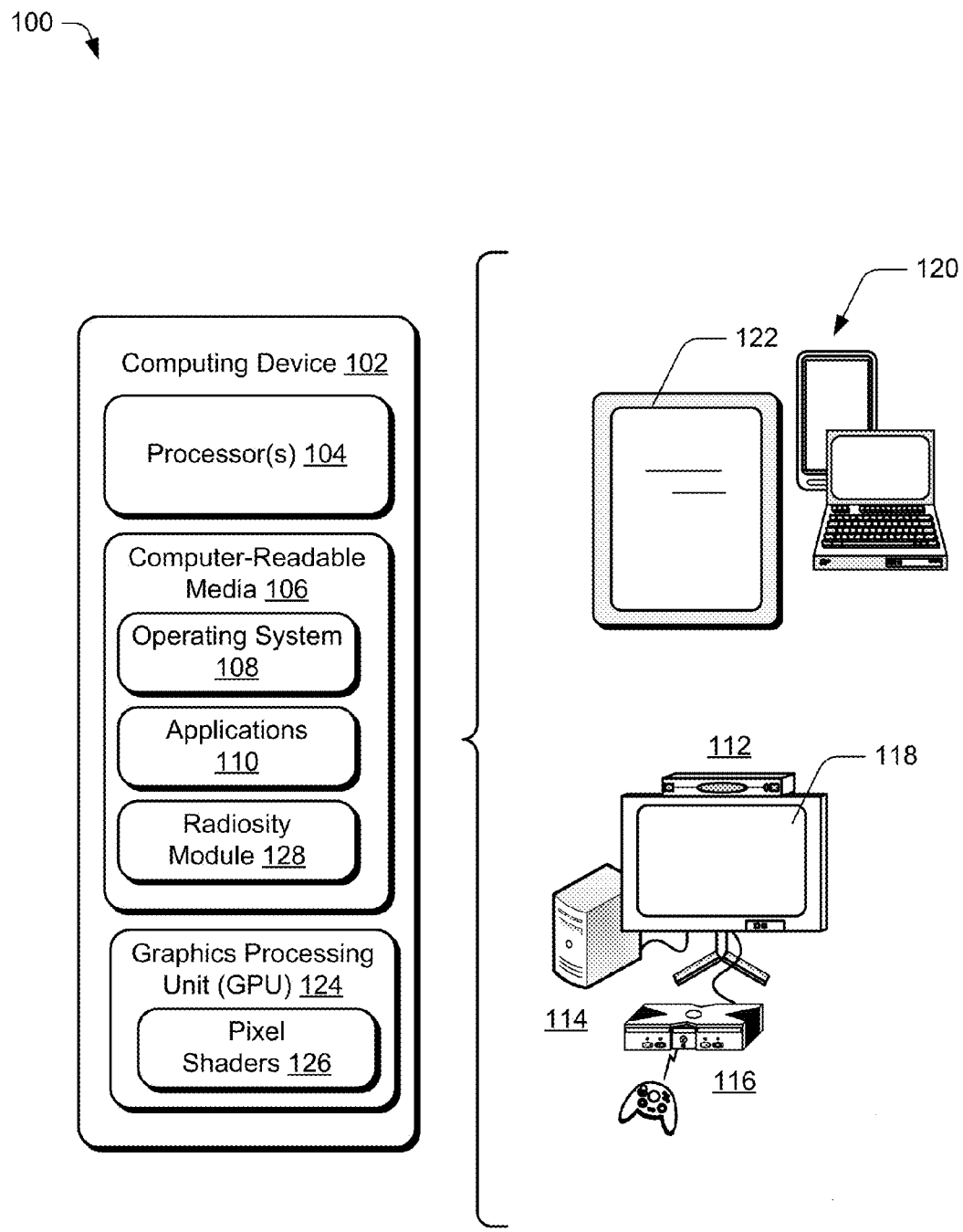
FIG. 1 illustrates an example operating environment in which one or more embodiments of single pass radiosity from depth peels can be employed.

FIG. 1 illustrates an operating environment in accordance with one or more embodiments, generally at 100. The environment 100 includes a computing device 102 having one or more processors 104 (e.g., CPUs), one or more computer-readable media 106, an operating system 108, and one or more applications 110 that reside on the computer-readable media and which are executable by the processor(s). The one or more processors 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. Any of the computing devices can be implemented with various components, such as one or more processors and memory devices, as well as with any combination of differing components. One example of a computing system that can represent various systems and/or devices including the computing device 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

The computing device 102 also includes a graphics processing unit (GPU) 124 separate from the processor(s) 104 that operates to perform various processing related to graphics output by the computing device for display on the display device 118 or integrated display 122. The GPU 124 is a hardware component of the computing device that is dedicated to graphics processing. Functionality provided by the GPU 124 may include controlling aspects of resolution, pixel shading operations, color depth, texture mapping, 3D rendering, and other tasks associated with rendering user interfaces and computer generated imagery (CGI) for applications. This can include processing tasks such as polygon drawing, bitmap transfers and painting, window resizing and repositioning, line drawing, font scaling, buffering, and so forth. As illustrated, the GPU may include or otherwise make use of pixels shaders 126 and/or other processing hardware and software components to perform various processing for graphics outputs. The GPU 124 may be capable of handling processing tasks in hardware at greater speeds than software that is executed on the processor(s) 104. Thus, the dedicated graphics processing capability of the GPU 124 can accelerate graphics processing, reduce the workload of the processor(s) 104, and free up system resources for other tasks.

The computing device 102 also includes a radiosity module 128 that may reside on the computer-readable media and which is executable by the processor(s). The radiosity module 128 represents functionality to perform various techniques for single pass radiosity from depth peels as described above and below. In at least some embodiments, the radiosity module 128 may be implemented as a component of an application 110 used to control aspects of graphics processing for the application. For instance, the radiosity module 128 may be provided as part of a game application for a gaming system to facilitate radiosity computations for the game via the GPU 124 in accordance with techniques described herein. The radiosity module 128 may also be implemented in other ways such as being configured as a standalone module as depicted in FIG. 1, as an integrated module of the GPU 124, and so forth.

In one or more embodiments, the GPU 124 may be operated under the influence of the radiosity module 128 to perform radiosity computations. Radiosity accounts for reflection of direct lighting sources diffusely from the surfaces of objects in a scene/frame. Such diffusely reflected or "bounced" light may contribute to the color, intensity, and/or shading of other objects in the scene/frame. Pixels shaders 126 of the GPU may be employed to output pixels having color, intensity, and/or shading that is determined based at least in part upon radiosity data computed by the radiosity module 128. In general, the radiosity module 128 is configured to use depth peels to implement radiosity computations that are much faster than traditional radiosity techniques. For example, radiosity computations using depth peel techniques described above and below may occur at frame rates typical for real-time game play and other graphics output rather than the hours or days it may take for traditional radiosity computations employed in a development environment.

By way of introduction, depth peeling is a technique traditionally used to render transparent objects by successive passes in which a geometry layer and corresponding surfaces that are nearest to the eye or viewpoint are selected and rendered. In each pass, the surfaces at the next nearest z-depth of the geometry are selected using depth tests to obtain depth and color information for the surfaces. Effectively, depth peels may be used to identify, manipulate, and render successive layers that are composited to generate a transparent looking object. This occurs without having to sort polygons in order. In accordance with the inventive principles described in greater detail below, the concept of depth peeling may be leveraged to implement fast radiosity computations that may be employed to generate photorealistic illumination effects in real-time during graphics output (e.g., at a frame rate for the output) as well as to facilitate creation of such effects for graphics/games in a development environment. Additional details regarding radiosity computations and depth peeling may be found in relation to the following figures.

Having described an example operating environment, consider now example techniques for single pass radiosity from depth peels in accordance with one or more embodiments.

Techniques for Single Pass Radiosity from Depth Peels

This section describes example implementation details and techniques for single pass radiosity from depth peels that may be implemented using the various devices and components described above and below. Radiosity computations may be employed to simulate realistic shadows and lighting within the context of global illumination for graphics rendering/CGI in video games, films, and other graphics presentation.

In particular, global illumination for frames of a graphics presentation may incorporate a radiosity algorithm to account for both light which comes directly from a light source (e.g., direct illumination) and "bounced" light due to reflection of direct light by geometry and surfaces in the scene (e.g., indirect illumination). In general, radiance leaving each point/pixel for surfaces of the geometry for a frame is computed as the sum of the emitted and reflected radiance. Typically, computing radiosity involves applying direct lighting and then accounting for a selected number of subsequent bounces of the light off of diffuse and reflective surfaces of the frame geometry. For each particular surface, the intensity of the particular surface depends upon the direct and reflected light contribution for the other surfaces in the frame.

To compute radiosity in a traditional manner, surfaces of a frame may be divided up into one or more smaller surfaces (e.g., surface patches). View factors that reflect how patches are arranged one to another are computed for each pair of patches. The view factors may be configured as coefficients that depend upon factors such as distance between patches, orientation of patches one to another, objects/geometry positioned between a pair of patches that may cause light occlusion, and so forth. View factor values assigned to surface patch pairs may increase as the amount of light energy transferred between the surface patch pairs increases.

The view factors are used to iteratively compute the radiosity, (e.g., brightness/intensity) of each patch in a series of successive light bounces. Each bounce produces intermediate values which are used as a starting point for the next bounce. The photorealism of the illumination may increase with each bounce. The number of bounces employed may be selected to achieve a defined quality threshold and/or to reach imperceptible levels. Such traditional radiosity techniques involve exhaustively computing the respective light intensity contributions of each patch to each other patch for each bounce, which causes significant computation times on the order of hours and day.

In accordance with techniques described herein, though, depth peels are employed to reduce the number of surface patches considered with respect to each light source. Accordingly, surfaces that are not relevant with respect to a particular light source and/or surface may be culled according to the depth peels. This dramatically increases the speed with which radiosity may be computed for each light source in each bounce to a matter of milliseconds. In other words, the repurposing of depth peels for radiosity computation as described herein accelerates computation by reducing the surface patches considered for each pass to surface patches that are relevant for each particular light source as determined by the depth peels.

Moreover, because the speed with which the computations may be completed for each light source is increased, the number of light sources and bounces employed may also be increased to further add to photorealism achieved for the resulting illumination. For example, a light source count and/or a bounce count may be selected to optimize radiosity processing such that further additions of lights/bounces would not produce changes that are perceptible to a viewer. In some embodiments, each visible pixel is taken as a possible light source. Thus, the count of light sources used to compute radiosity and illumination for a scene may be increased up to a per visible pixel density.

As noted above, depth peeling is a technique ordinarily used to render translucent polygonal geometry without having to sort polygons. For the purpose of computing single pass radiosity, the surface patch geometry for a frame being processed may be peeled with respect to each light source considered into one front depth peel and one back depth peel by applying existing depth peeling techniques. These front and back depth peels may be quickly computed in a single pass for each lighting position.

In particular, for each light source the geometry within light source's visible frustum is considered. A surface patch facing a light source within its visible frustum occludes the light from the source and blocks its contribution, and the remaining non-occluded light which surface patches do not block contributes to the illumination. The front depth peel of the culled subset of the geometry is employed to determine the surface patches that occlude the light from the source. Specifically, the front depth peel gives the positions for occluders of second bounce light. The corresponding back depth peel is derived from the front depth peel as the rejected geometry of the front depth peel. The back depth peel is employed to determine colors and intensities of corresponding surfaces, which may then be used to modulate the characteristics of surface patches that are not occluded for the next layer of bounces (e.g., third bounce light)

Figure 2:
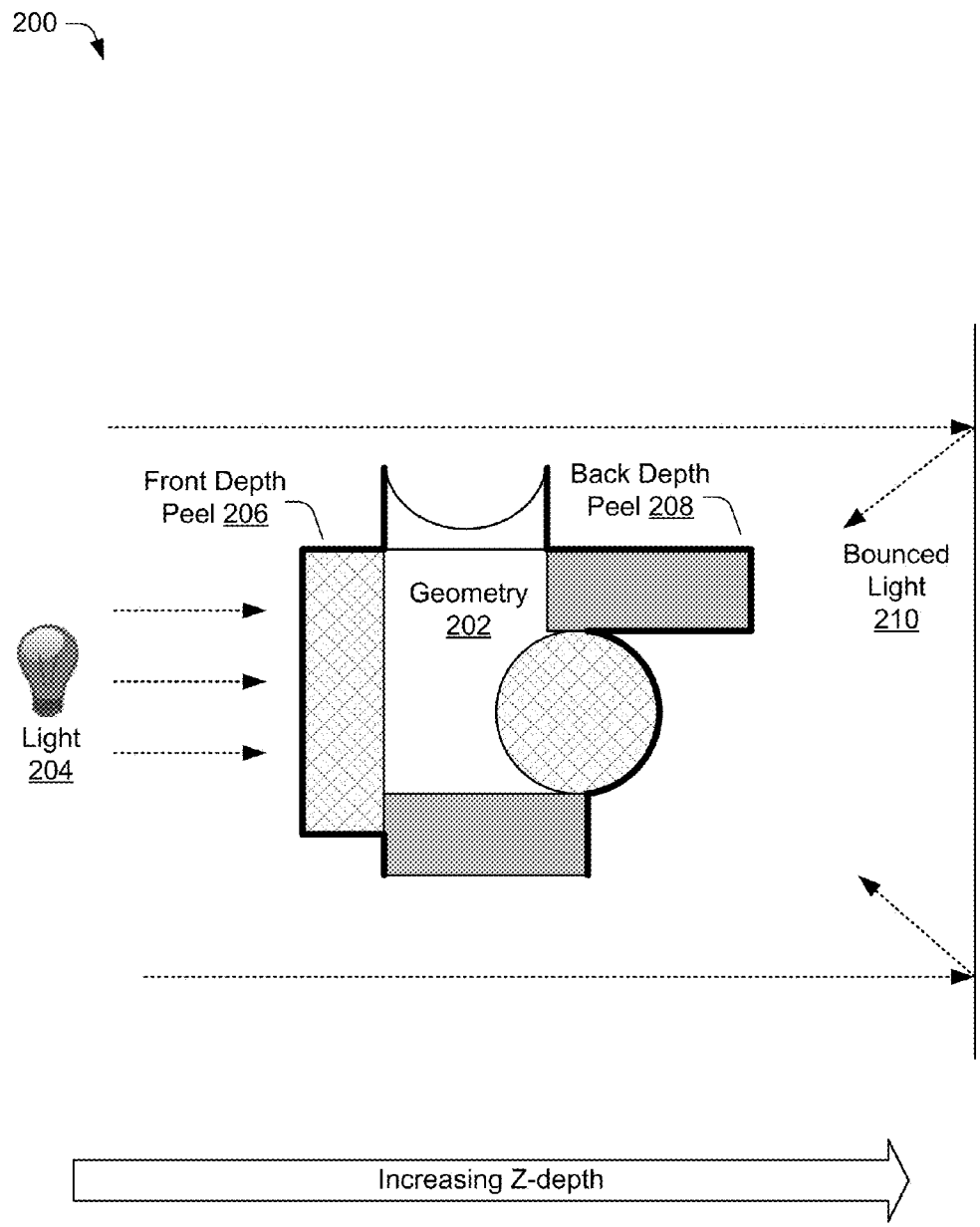
FIG. 2 is an example diagram that illustrates some aspects of radiosity computations from depth peels in accordance with one or more embodiments.

To further illustrate the foregoing concepts, consider FIG. 2 which is a diagram that depicts generally at 200 an example that represents aspects of using depth peels to compute radiosity. In particular, FIG. 2 depicts representative geometry 202 that may be illuminated by one or more light sources, such as the example light 204. In this example, a front depth peel 206 is shown as a thick line that represents surface patches that occlude second bounce light. Likewise, a back depth peel 208 is shown as a thick line that represents surfaces off of which bounced light 210 (e.g., $2^{nd}$ bounce light) may be further reflected and/or diffused in a subsequent light bounce (e.g., $3^{rd}$ bounce light). As such, the colors and intensities of the back depth peel 208 provide color modulation data used to adjust surfaces to which the light is reflected in the subsequent light bounce. As mentioned, the back depth peel 208 may be derived from the rejected geometry from the front depth peel 206. In other words, the back depth peel 208 is the backside of the occlusion surfaces included in the front depth peel 206. Effectively, using the depth peels enables computation of three bounces for radiosity simultaneously in a single-pass which results in the acceleration of processing as described previously. Additional details regarding these and other aspects of techniques for single pass radiosity from depth peels are described in relation to the following procedures.

Consider now the following discussion of example flow diagrams that describe techniques for single pass radiosity from depth peels that can be implemented in accordance with one or more embodiments. The example procedure(s) depicted can be implemented in connection with any suitable hardware, software, firmware, or combination thereof. In at least some embodiments, the methods can be implemented by way of a suitability configured computing device, such as the example computing device 102 of FIG. 1 that includes or otherwise makes use of a radiosity module 128.

Figure 3:
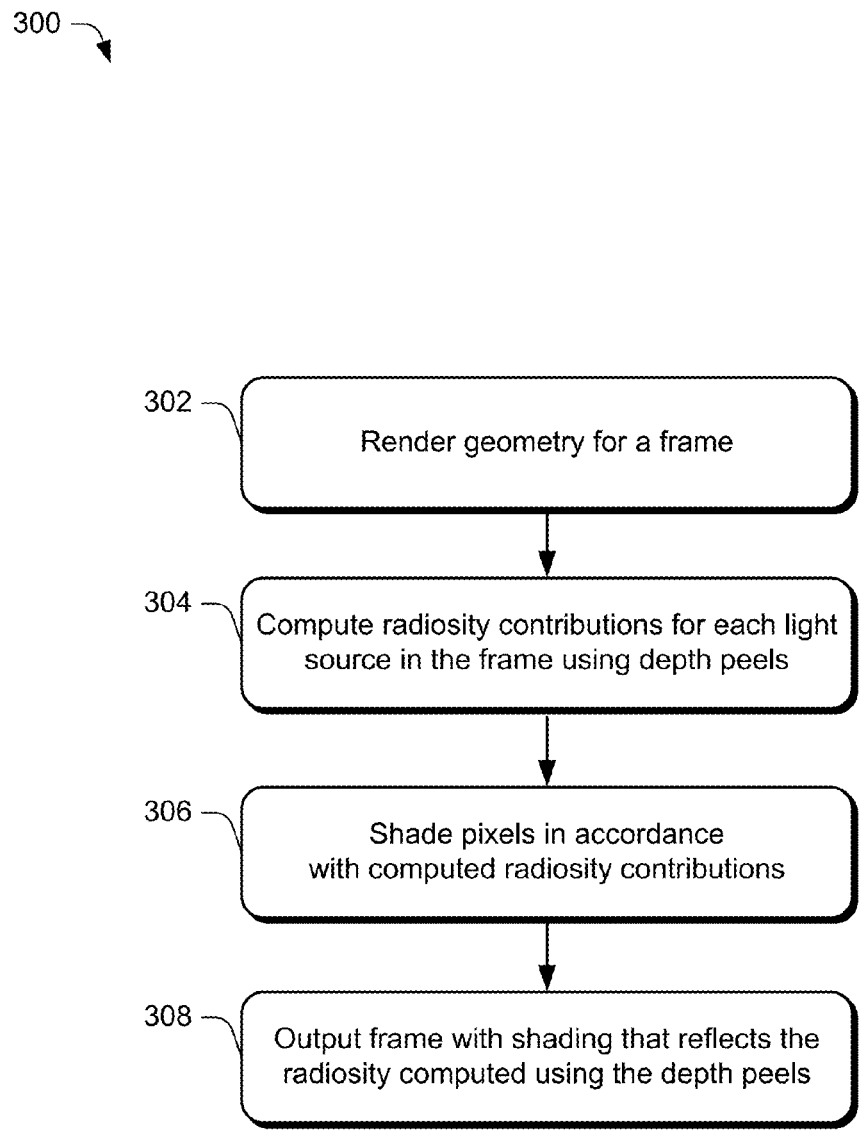
FIG. 3 is a flow diagram that describes details of an example procedure in accordance with one or more embodiments.

In particular, FIG. 3 depicts an example procedure 300 in which radiosity is computed using depth peels. Geometry for a frame is rendered (block 302). For example, a GPU 124 of a computing device 102 may be used to process frames for a gaming application, a video playback, or other graphics presentation. In at least some embodiments, the GPU 124 may implement deferred rendering techniques. In deferred rendering, geometry data and lighting data for a frame are rendered into separate buffers that are then combined to produce a composite result. In this approach, geometry rendering is decoupled from the illumination for the frame. Other rendering techniques may also be employed. A deferred buffer may include information regarding initial colors, normal directions, and z-depths of pixels in the frame. Illumination may then be applied to compute output colors for the pixels based on one or more light sources defined for the scene/frame.

Radiosity contributions for each light source in the frame are computed using depth peels (block 304). In accordance with techniques described herein, the illumination may encompass computation of radiosity effects that are determined using depth peels to account for indirect bounced light. In particular, the depth peels may be employed to compute three light bounces for radiosity in a single pass. The depth peels may be configured as specialized shadow maps indicative of surface patches and properties of the rendered geometry at selected depths relative to a viewpoint (e.g., camera position) for the frame. Here, a single pass may refer to one processing pass of a pixel shader 126 (implemented via a GPU or otherwise) to calculate pixel coloration pixel-by-pixel (e.g., color, shading, transparency, intensity, etc. for each pixel). The radiosity computation based on depth peels produces realistic lighting simulations for computer generated graphics. The radiosity computation may also be performed real-time for frames of a graphics presentation (e.g., frame-by-frame at runtime) to account for dynamic and/or user controlled movement of objects in the graphics presentation. Thus, real-time changes in illumination for a frame relative to a previous frame due to dynamically moving objects in the frame may be reflected in graphics presentations using the described techniques.

For example, a radiosity module 128 may be implemented to determine a front depth peel and a back depth peel with respect to each of the one or more light sources. In some embodiments, various processing for radiosity, including determining depth peels, may be performed by a graphics processing unit (GPU) under the influence of the radiosity module 128. Processing may also occur via a central processing unit (CPU) or other processing system using various hardware, software, firmware, and/or combinations thereof.

Generally, the front depth peel and the back depth peel determined with respect to a particular one of the light sources are sufficient to compute three light bounces simultaneously for radiosity associated with the particular one of the light sources. Specifically, the front depth peel represents surface patches of rendered geometry that occlude second bounce light associated with a particular light source. The corresponding back depth peel represents color and intensities for third bounce light used to adjust surface patches of the geometry to which the third bounce light is reflected. In making modifications of direct and second bounce light based on the depth peels, the back depth peel may be applied to those surface patches that are not occluded as indicated by the front depth peel. Moreover, since the back depth peel corresponds to rejected geometry of the front depth peel, processing that is already performed to compute the front depth peel may be used to obtain the back depth peel directly. Additionally, the depth peel processing may replace shadow map processing used in traditional rendering techniques and therefore the depth peel computation is effectively "free" from a processing power/processing time consumption standpoint.

Pixels are shaded in accordance with the computed radiosity contributions (block 306). Then, the frame is output with shading that reflects the radiosity contributions computed using the depth peels (block 308). Here, a pixel shader 126 may be employed to apply the radiosity contributions determined based on the depth peels to produce output colors/illumination characteristics for the frame. In the case of deferred rendering, this may involve compositing multiple different intermediate frame buffers used to separate geometry, color, and lighting data including intermediate radiosity data computed for each light bounce. The result of compositing the frame buffers is an output frame that includes photorealistic illumination effects incorporating the radiosity contributions.

As mentioned, the use of depth peels enables the radiosity processing to occur in a matter of milliseconds for each frame. The techniques may therefore be used "in-game" for output of graphics for a gaming application or otherwise be applied in real-time during output of a graphics presentation. The techniques may also be used in a development environment as part of a graphics development system to accelerate illumination design processes and enhance production of games and other CGI development.

Figure 4:
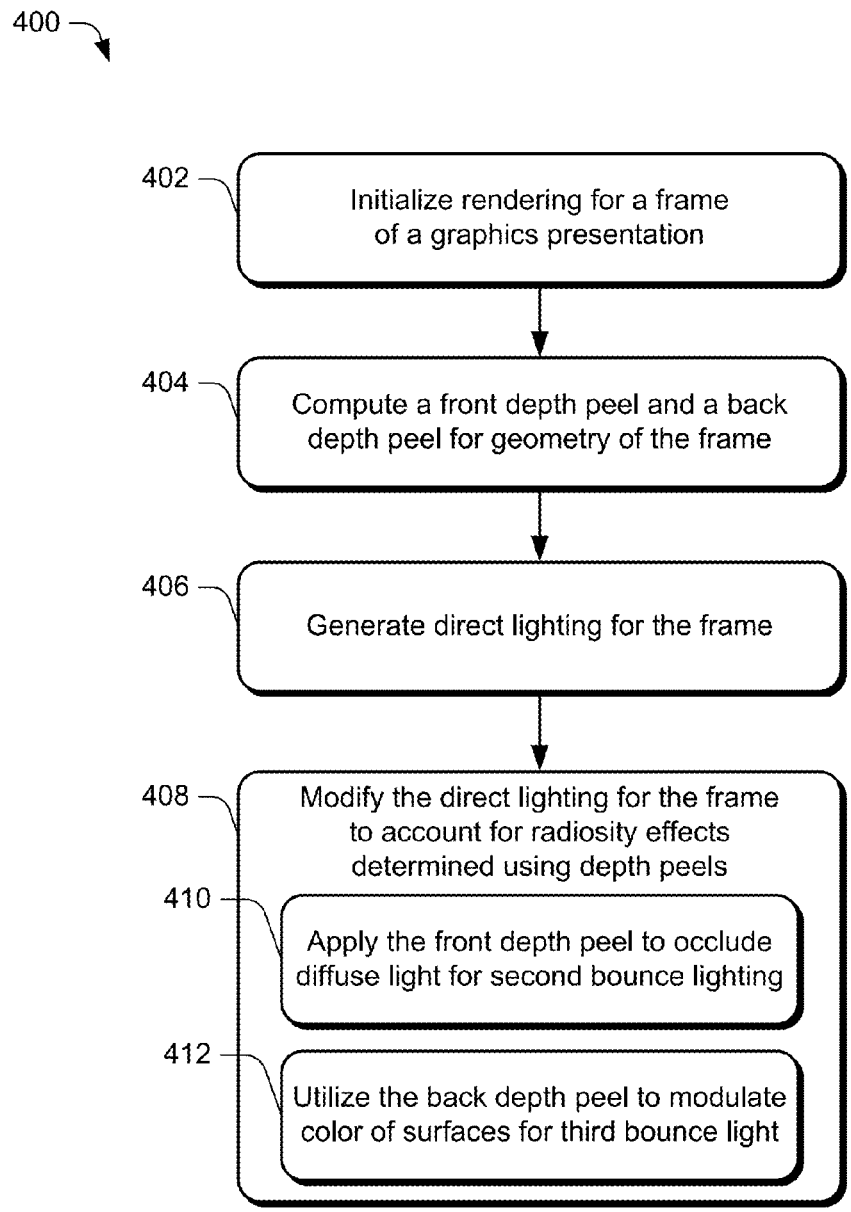
FIG. 4 is a flow diagram that describes details of another example procedure in accordance with one or more embodiments.

FIG. 4 depicts an example procedure 400 in which front and back depth peels are employed to compute radiosity for a graphics presentation. Rendering is initialized for a frame of a graphics presentation (block 402). Rendering may occur in various ways as previously discussed. A front depth peel and a back depth peel are computed for geometry of the frame (block 404). In one approach, geometry for the frame may be rendered to an intermediate frame buffer. The radiosity module 128 may operate to compute a front depth peel and back depth peel with respect to a reference point using the frame buffer that defines the geometry for a frame. Here, the reference point may be the camera position, light position, or other viewpoint for the frame. The front depth peel and back depth peel may be determined at the same time by peeling layers from opposite directions relative to the reference point simultaneously. This provides a shadow map as the front depth peel that indicates surface patches acting as occluders for direct and secondary light. This also provides as the back depth peel a shadow map that indicates colors and intensities for light that bounces off of surface patches (e.g., those surface patches that are not occluded by the front depth peel occluder surfaces). The derived depth peels may be stored in one or more buffers and used for subsequent radiosity computations.

Direct lighting is generated for the frame (block 406). Direct lighting is applied according to one or more direct light sources defined in the scene. The contribution of direct light to coloration/illumination for illuminated patches in the frame may be generated using existing techniques.

The direct lighting for the frame is then modified to account for radiosity effects determined using depth peels (block 408). As represented in FIG. 4, this may involve applying the pre-computed depth peels to determine how to modulate and/or attenuate colors, shading, intensity, transparency, and/or illumination characteristics of pixels as indicated as a result of the direct lighting. In particular, the front depth peel is applied to occlude diffuse light for second bounce lighting (block 410) and the back depth peel is utilized to modulate color of surfaces for third bounce light that is not occluded according to the front depth peel (block 412). Here, the front depth peel is used to resolve which surfaces in the frame are occluded in the frame and which surfaces are affected by bounced light. The back depth peel is then employed to adjust the appropriate surfaces (e.g., the non-occluded surfaces to which light is reflected) in accordance with the colors and intensities indicated by the back depth peel. The computation as just described may be conducted with respect to one or more light sources and/or for multiple bounces. In some case, each surface patch/pixel defined by the intermediate frame buffer that is visible with respect to a selected reference point (e.g., selected camera position or light source) is used as a possible light source for reflected/diffuse lighting with respect to the reference point. Radiosity contributions computed for multiple reference points/light sources may be combined to ascertain overall radiosity effects for each relevant surface patch. Pixel illumination characteristics obtained based on direct lighting are then modified to produce illumination for the output frame that incorporates radiosity effects derived using depth peels.

Having considered example details of single pass radiosity from depth peels, consider a discussion of an example system in accordance with one or more embodiments.

Example System

Figure 5:
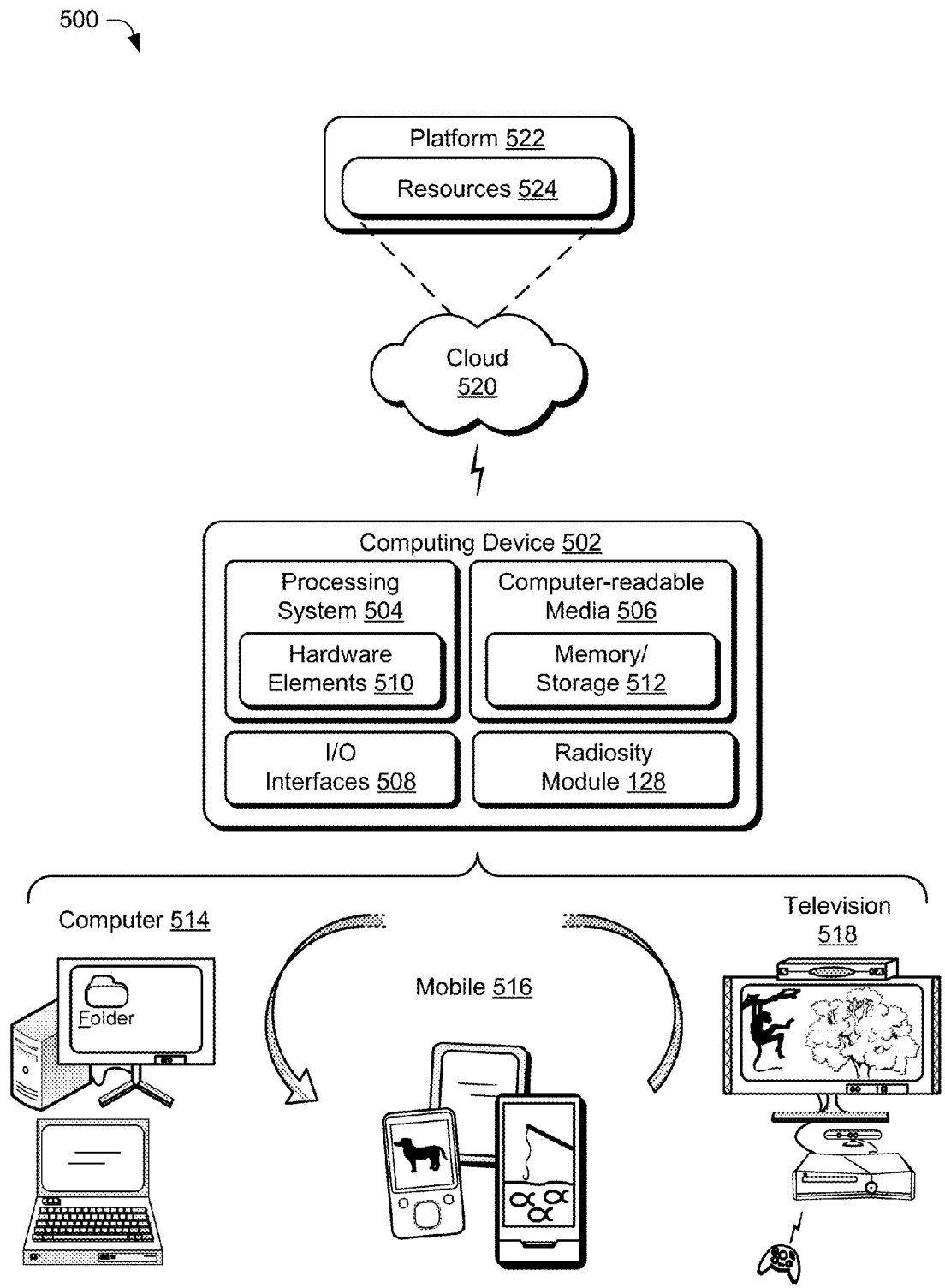
FIG. 5 is a block diagram of a system that can implement the various embodiments.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, radiosity module 128, and other program modules may be implemented as one or more instructions and/or logic embodied on some form of computer-readable storage media and/or by one or more hardware elements 510. The computing device 502 may be configured to implement particular instructions and/or or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the radiosity module 128 on the computing device 502. The functionality represented by the radiosity module 128 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by a computing device comprising:
    rendering geometry for a frame of a graphics presentation;
    computing, in a single rendering pass, multiple bounce radiosity contributions for one or more light sources in the frame based at least in part upon depth peels applied to the rendered geometry, the depth peels comprising a front depth peel and a back depth peel generated in the single rendering pass, the back depth peel being derived from the front depth peel by reusing rejected geometry of the front depth peel;
    shading pixels of the frame in accordance with the radiosity computed in the single rendering pass; and
    outputting the frame for the graphics presentation with shading that reflects the radiosity contributions computed using the depth peels.

2. The method of claim 1, wherein the rendering and computing are performed by a graphics processing unit (GPU) of the computing device under the influence of a radiosity module.

3. The method of claim 1, wherein the front depth peel and the back depth peel are computed with respect to each of the one or more light sources.

4. The method of claim 3, wherein the front depth peel and the back depth peel determined with respect to a particular one of the light sources are sufficient to compute three light bounces simultaneously for radiosity associated with the particular one of the light sources.

5. The method of claim 3, wherein the front depth peel determined with respect to a particular one of the light sources represents surface patches of the rendered geometry that occlude second bounce light associated with the particular one of the light sources.

6. The method of claim 5, wherein the back depth peel determined with respect to the particular one of the light sources represents color and intensities for third bounce light used to adjust surface patches of the geometry to which the third bounce light is reflected.

7. The method of claim 1, wherein computation of the radiosity contributions is performed for each frame of the graphics presentation at a frame rate for the graphics presentation during output of the graphics presentation.

8. The method of claim 1, wherein the radiosity contributions that are computed reflect real-time changes in illumination for the frame relative to a previous frame due to dynamically moving objects in the graphics presentation.

9. The method of claim 1, wherein the depth peels comprise shadow maps indicative of surface patches of the rendered geometry at selected depths relative to a viewpoint for the frame.

10. The method of claim 1, wherein the shading comprises
    generating direct lighting for the graphics presentation based on the one or more light sources; and
    modifying colors of pixels produced by the direct lighting to reflect the radiosity contributions computed using the depth peels.

11. The method of claim 1, wherein the graphics presentation comprises an output for a game application executed by the computing device.

12. One or more computer-readable storage media storing instructions that when executed by a computing device cause the computing device to implement a radiosity module operable to perform acts comprising:

computing a front depth peel and a back depth peel for a frame of a graphics presentation output by the computing device, the back depth peel computed by reusing rejected geometry of the front depth peel, the front depth peel and the back depth peel generated in a single rendering pass;

generating direct lighting for the frame; and modifying the direct lighting to account for radiosity effects determined using depth peels including:

applying the front depth peel for the frame to occlude diffuse light for second bounce lighting; and utilizing the back depth peel to modulate color of surface patches for third bounce lighting.

13. One or more computer-readable storage media of claim 12, wherein modifying the direct lighting to account for radiosity effects determined using depth peels further comprises computing radiosity contributions for multiple light sources associated with the frame and combining the radiosity contributions to adjust illumination characteristics of objects indicated as a result of the direct lighting.

14. One or more computer-readable storage media of claim 12, wherein utilizing the back depth peel comprises applying color and intensity data for surface patches included in the back depth peel to those surface patches of the graphics presentation that are not occluded as indicated by the front depth peel.

15. One or more computer-readable storage media of claim 12, wherein the radiosity module is implemented as a component of a graphics development system in a development environment to accelerate illumination design processes for graphics presentations.

16. One or more computer-readable storage media of claim 12, wherein the radiosity contributions that are computed reflect real-time changes in illumination for the frame relative to a previous frame due to dynamically moving objects in the graphics presentation.

17. A system comprising:

a graphic processing unit (GPU); and one or more computer-readable media storing instructions that, when executed by the GPU, implement a radiosity module to:

compute radiosity for surface patches in an input frame of a graphics presentation using depths peels including a front depth peel and a back depth peel derived for each of one or more light sources defined in the input frame, the radiosity being computed for multiple light bounces in a single rendering pass performed to process the input frame for output by the system, the back depth peel computed by reusing rejected geometry of the front depth peel, the front depth peel and the back depth peel computed in the single rendering pass; and generate an output frame for the graphics presentation having illumination for the surface patches that reflects the radiosity that is computed in the single rendering pass using the depth peels.

18. The system of claim 17, wherein:

the front depth peel derived for each particular light source represents surface patches of geometry for the input frame that occlude second bounce light associated with the particular light source; and the back depth peel derived for each particular light source represents color and intensities for third bounce light used to adjust surface patches of the geometry for the input frame to which the third bounce light is reflected.

19. The system of claim 17, wherein the radiosity for each of the one or more light sources is computed with respect to a culled subset of geometry for the input frame that is within the visible frustum of the respective light source.

20. The system of claim 17, wherein the system comprises a gaming system and the radiosity module is implemented as a component of a gaming application for the gaming system.

* * * * *